A. G. HERRESHOFF.
SHAFT COUPLING.
APPLICATION FILED MAR. 13, 1919.
1,306,541. Patented June 10, 1919.
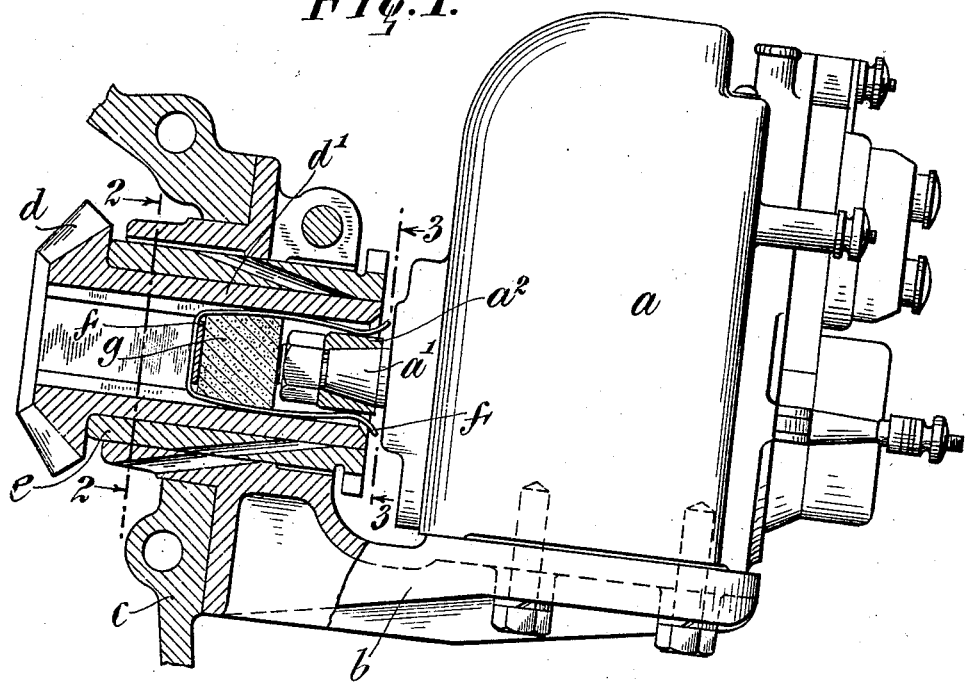
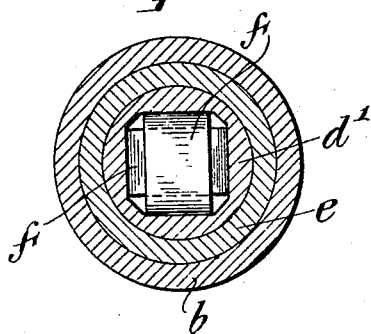
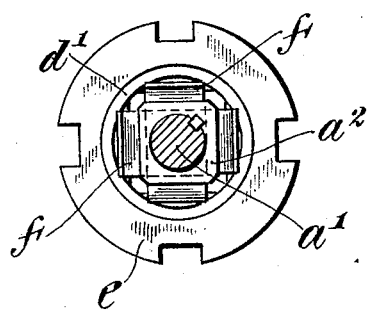
WITNESS:
INVENTOR
Alexander Griswold Herreshoff
BY
ATTORNEYS

UNITED STATES PATENT OFFICE.

ALEXANDER GRISWOLD HERRESHOFF, OF NEW YORK, N. Y., ASSIGNOR TO INTERNATIONAL MOTOR COMPANY, OF NEW YORK, N. Y., A CORPORATION OF DELAWARE.

SHAFT-COUPLING.

1,306,541.  Specification of Letters Patent.  Patented June 10, 1919.

Application filed March 13, 1919. Serial No. 282,366.

*To all whom it may concern:*

Be it known that I, ALEXANDER GRISWOLD HERRESHOFF, a citizen of the United States, residing in the borough of Manhattan of the city of New York, in the State of New York, have invented certain new and useful Improvements in Shaft-Couplings, of which the following is a specification, reference being had to the accompanying drawings, forming a part hereof.

This invention relates to a simple and inexpensive coupling for shafts which is of such character as to permit the ready coupling and uncoupling of such shafts and compensate for nonalinement thereof. From the production standpoint the invention seeks to provide a coupling which shall be inexpensive in initial cost and may be assembled or disassembled readily when in use. The improved coupling will be found to lend itself particularly to use with the associated parts of internal combustion motors, where compactness and accessability are prime factors. The embodiment of the invention illustrated in the accompanying drawings shows the improved coupling applied to a magneto.

In the drawings—

Figure 1 is a view partly in section and partly in elevation with the improved coupling in a magneto shaft.

Fig. 2 is a view in transverse section taken along the plane indicated by the line 2—2 of Fig. 1 and looking in the direction of the arrows.

Fig. 3 is a view partly in section and partly in end elevation taken along the plane indicated by the line 3—3 of Fig. 1 and looking in the direction of the arrows.

As the description proceeds it will become evident that the improved coupling may be used in any shafting, but experience has shown that it is especially adaptable for the connection of the driven shafts of the associated elements of an internal combustion engine. For this reason the coupling will be described in its application to the connection with the armature of a magneto to the driving shaft thereof. The magneto $a$ is represented as supported on a bracket $b$ which may be secured to the frame of a motor $c$. This magneto will derive its power, as usual, from the crank shaft of the motor. The driving gear $d$ for the magneto may be journaled in a suitable bearing $e$ carried by the bracket $b$ and this gear $d$ may be assumed to be connected operatively with the crank shaft. The driving of the magneto shaft $a'$ of the gear $d$ involves not only a ready connection and disconnection of these elements as required but also the possible nonalinement of the shaft $a'$ with the hub $d'$ of the gear. Accordingly, in motor practice particularly, there is required in this situation a coupling which will readily compensate for disalinement of the shafting and facilitate its connection and disconnection. In carrying out the invention the bore of the hub $d'$ of the gear $d$ is squared and is of such size as to receive freely the squared nut $a^2$ keyed on the end of the magneto shaft $a'$. Within the bore of the hub $d'$ are placed two leaf springs $f$ of generally U-shape and disposed at right angles to each other. These springs bear, respectively against the opposite side walls of the squared bore. The legs of the springs are somewhat concave adjacent their mid-sections so as to bear tangentially against the inner walls of the hub. Near their outer ends, however, these springs $f$ may be bent somewhat convex so as to engage and bear tangentially against the opposite faces of the nut $a^2$. Within the springs $f$ may be placed a pad $g$ of felt which may be saturated with a lubricant to keep the bearing surfaces of the springs properly oiled.

In assembling, the springs $f$ are slipped in the broached end of the hub $d'$ and the magneto $a$ is placed on the bracket $b$ with the squared head of the nut $a^2$ embraced by the springs. By reason of the relative sizes of the nut $a^2$, the springs $f$, and the bore of the hub $d'$, the assembling may be accomplished readily. If there be any disalinement of the shaft $a'$ and the hub $d'$ such disalinement cannot interfere with the assembling of the parts and cannot appreciably affect the driving efficiency since the bowed springs may have a slight rocking action sufficient to compensate for the disalinement. Further, if the shaft $a'$ is so arranged with respect to the hub $d'$ that some universal connection is required, the improved coupling will afford the necessary universal movement. In disassembling the parts it will be evident that the springs $f$ may be readily withdrawn when the magneto is removed.

It is to be understood that the invention is not to be limited in the application of the coupling to a magneto, nor to the precise form of the parts as illustrated. For instance, the hub $d'$ need not be hollow throughout, but might have only one end broached. Further, the bore of the hub instead of being squared out might have a general polygonal form. In this case, more than two crossed springs would probably be employed and the engaged member $a^2$ would have a form of the same general shape as the bore.

The general scope of the invention is represented in the appended claims.

I claim as my invention:

1. In combination, a driving shaft, a driven shaft, one of said shafts being broached at one end to receive loosely the end of the other of said shafts, opposed bearing faces formed internally of the said broached portion, corresponding bearing faces carried externally of the entering end of the other of said shafts, and leaf springs disposed within the broached portion and adapted to bear on said opposed faces of both of said shafts to couple the two yieldingly.

2. In combination, a driving shaft, a driven shaft, one of said shafts being broached at one end to receive loosely the end of the other of said shafts, opposed bearing faces formed internally of the said broached portion, corresponding bearing faces carried externally of the entering end of the other of said shafts, and U-shaped leaf springs disposed within the broached portion and adapted to bear on said opposed faces of both of said shafts to couple the two yieldingly.

3. In combination, a driving shaft, a driven shaft, one of said shafts being broached out square at one end to receive loosely the end of the other of said shafts, opposed bearing faces formed internally of the said broached portion, a squared bearing member carried on the entering end of the other shaft, and two U-shaped leaf springs within the broached portion and set within one another at right angles to bear against the opposed faces of both of said shafts to couple the two yieldingly.

4. In combination, a driving shaft, a driven shaft, one of said shafts being broached at one end to receive loosely the end of the other of said shafts, opposed bearing faces formed internally of the said broached portion, corresponding bearing faces carried externally of the entering end of the other of said shafts, and U-shaped leaf springs bowed convex adjacent their mid-sections to bear tangentially against the inner face of the broached portion and bowed concave adjacent their ends to bear tangentially against the external bearing faces of the other of said shafts to couple the two shafts yieldingly.

5. In combination, a driving shaft, a driven shaft, one of said shafts being broached at each end to receive loosely the end of the other of said shafts, opposed bearing faces formed internally of the said broached portion, corresponding bearing faces carried externally of the entering end of the other of said shafts, U-shaped leaf springs disposed within the broached portion and adapted to bear on said opposed faces of both of said shafts to couple the two yieldingly, and a pad of felt saturated with a lubricant disposed within the springs.

This specification signed this 11th day of March, A. D. 1919.

ALEXANDER GRISWOLD HERRESHOFF.

Copies of this patent may be obtained for five cents each, by addressing the "Commissioner of Patents, Washington, D. C."